(12) United States Patent
Lederer

(10) Patent No.: US 6,659,942 B2
(45) Date of Patent: Dec. 9, 2003

(54) ENDOSCOPE WITH A DEFLECTION SYSTEM

(75) Inventor: Frank Lederer, Tuttlingen (DE)

(73) Assignee: Karl Storz GmbH & Co. KG (DE)

( * ) Notice: Subject to any disclaimer, the term of this patent is extended or adjusted under 35 U.S.C. 154(b) by 39 days.

(21) Appl. No.: 10/025,404

(22) Filed: Dec. 19, 2001

(65) Prior Publication Data

US 2002/0091305 A1 Jul. 11, 2002

Related U.S. Application Data

(63) Continuation of application No. PCT/EP00/05331, filed on Jun. 6, 2000.

(30) Foreign Application Priority Data

Jun. 25, 1999 (DE) .......................................... 199 29 045

(51) Int. Cl.⁷ .............................................. A61B 1/002
(52) U.S. Cl. ........................ 600/171; 600/176; 359/833
(58) Field of Search ................................. 600/171, 176; 359/833, 834, 835, 836

(56) References Cited

U.S. PATENT DOCUMENTS

| | | | | | |
|---|---|---|---|---|---|
| 1,632,290 | A | * | 6/1927 | Heymer | 600/171 |
| 4,113,354 | A | * | 9/1978 | Yamasita et al. | 359/636 |
| 4,783,156 | A | * | 11/1988 | Yokota | 359/736 |
| 6,282,381 | B1 | * | 8/2001 | Koyama | 396/384 |
| 6,327,094 | B1 | * | 12/2001 | Aoki | 359/637 |

* cited by examiner

Primary Examiner—John P. Leubecker
(74) Attorney, Agent, or Firm—St. Onge Steward Johnston & Reens LLC

(57) ABSTRACT

The present invention relates to an endoscope comprising a deflection system for a visual angle of up to 30 degrees which comprises reflective deflection elements. The inventive endoscope is characterized in that the beams which form the image are reflected more than twice. This enables visual angles of less than 30 degrees to be used, without any reduction in the image quality.

16 Claims, 3 Drawing Sheets

ENDOSCOPE WITH A DEFLECTION SYSTEM

This application is a continuation of pending International Application PCT/EP00/05331 filed on Jun. 6, 2000, which designates the United States and claims priority from German Application 199 29 245.8 filed on Jun. 25, 1999.

FIELD OF THE INVENTION

The invention relates to an endoscope comprising a relay system defining an endoscope axis, and a deflection system for deflecting a beam entering the endoscope at an angle of up to 30 degrees with respect to said endoscope axis, while the deflection system contains deflection elements provided with reflecting surfaces.

Endoscopes have at their distal end a lens which forms an image of the scene under observation. This image is relayed optically or electronically to the proximal end, where it is accessible to observation. Endoscope lenses must be designed in such a way that they can be accommodated within a narrow tube.

It is often desirable for the field of view not to be arranged symmetrically, with respect to the axis of the endoscope, but rather for the direction of view to form a fairly small or even significant angle with the axis of the endoscope. In this case it is necessary for deflecting elements to be provided which divert light from the field of view that is to be pictured in the direction of the endoscope axis. Which deflecting elements are appropriate is determined chiefly by the desired visual angle of the endoscope, that is, by the angle of deflection.

In known endoscopes, at small angles of deflection up to about 15 degrees, use is made of refracting elements like wedge plates, a non-centered frontal lens, a non-centered eyepiece unit, or combinations of the same, as deflecting elements. At larger angles of deflection, starting at about 25 degrees, use is made, on the other hand, of reflecting elements such as prisms with reflected surfaces.

Wedge plates or the decentering of imaging optical elements have the disadvantage of worsening the image quality through a distortion of the field of view that increases with the angle of deflection. If the eyepiece unit is non-centered, then in addition the size of the image field must be reduced, in order to avoid vignetting. Refracting elements, moreover, cause color errors in principle, which must be corrected at considerable expense.

Reflecting optical elements do not have these deficiencies. A deflection system, in which two reflecting surfaces are provided, is described in DE 35 37 155 A1. Here the lens has a lens system which forms the lens field in the image plane, which is arranged vertically to the axis of the endoscope. Between the plano-concave front lenses and the other lenses of the lens system, a deflection unit is installed, consisting of two prisms cemented together, in which unit the light entering from the lens field is reflected onto an external surface of one of the prisms, which surface is parallel to the endoscope axis, and the light is reflected on the interface between the prisms.

BACKGROUND OF THE INVENTION

In a similarly built system known from U.S. Pat. No. 4,684,224, a plano-parallel plate is installed on the entering surface of the deflection unit, onto which surface a plano-concave lens is cemented. This deflection unit provides two reflecting surfaces, both of which are at an angle to the axis of the endoscope.

From WO 99/10762, an endoscope lens is known in which the deflection unit consists of just one prism with two reflecting surfaces, and onto which the plano-concave frontal lens is cemented directly. A plane-parallel plate or a second prism is not necessary here, because a totally reflecting layer is applied on the side turned toward the frontal lens.

An endoscope lens known from DE 24 58 306 C3 consists of two prisms, where the deflected beam entering the endoscope axis are reflected not more than twice on two interfaces of one of the prisms. The U.S. Pat. No. 4,730,909 discloses a deflection system for angles of deflection of more than 90 degrees where the entering reflected more than twice.

The said endoscope lenses comprising the reflective deflection elements both show that they are not suitable for deflection angles of less than about 30 degrees, or can only be used at the price of accepting restrictions in the available image field diameter, a distortion of the field of view, or any other reduction in the image quality.

It is the purpose of the present invention to provide a deflection system for an endoscope which does not have the above-mentioned disadvantages of the refracting elements, and which is also suitable for deflection angles of less than 30 degrees, as well as to provide an endoscope comprising a deflection system of this type. A deflection system for deflection angles of 5 to 25 degrees, especially in the range of about 15 degrees, is preferable.

In accordance with the present invention, this objective is fulfilled by the features defined in claim 1. Since the deflection system comprises deflection elements containing reflecting surfaces, while said reflecting surfaces are arranged in such a way that the beam deflected into the optical axis is reflected more than twice, it is possible to obtain deflection angles between 0 and 30 degrees within a restricted space of the deflection system. This is made possible without any of the disadvantages associated with refractive deflecting elements. Here the optical axis is the axis of the endoscope, especially the optical axis of the optical elements connected in series to the deflection system; for example, optical elements of the lens.

According to a preferred embodiment of the present invention, at least one reflecting surface is used in transmission as well as in reflection. This takes advantage of the fact that transmissions occur at small angles of incidence, whereas large angles of incidence cause a reflection. This feature allows an especially compact design, since the reflecting surface may extend over the entire cross-section without reducing the surface available for transmission.

According to another preferred embodiment of the present invention, the said reflecting surface is used only once for transmission, whereas one or more reflections may occur on this surface. This makes it possible to obtain deflection angles within the desired range with relatively fewer optical elements as well as with a relatively few reflections.

According to another preferred embodiment of the present invention, the reflected on said reflecting surface against a thin layer, whereas said layer may also consist of a coating of several thin layers. Depending on the angle of incidence, a transparent coating permits both transmission and reflection. Although the reflection may also be obtained against another glass material or even air, the advantage of the reflection on a thin layer is that said reflection is only determined by the materials which the carrier is made of and within which the reflection occurs, as well as by the layer itself. An air gap or another means may be provided on the side of the layer opposite to the carrier without considerably affecting the reflection.

According to another preferred embodiment of the present invention, the beam deflected into the optical axis is totally reflected on at least one reflecting surface. The advantage of this is a virtually loss-free reflection.

If the refractive index of a totally reflecting layer is n(layer), and the index of the carrier is n(glass), the following equation applies for the limiting angle_(limit) of the total reflection against the layer:

sin_(limit)=n(layer)/n(glass)

This means that it is necessary that n(layer)<n(glass)

in order for a total reflection even to be possible. Moreover, the following equation applies for the thickness d of the layer:

d>1.2_/n(layer)

where_is the wave length of the light in use so as to obtain a loss-free total reflection.

A layer of this type can be designed as a single-layer or multi-layer system and can be applied by means of known coating processes as disclosed in WO 99/10762. For multi-layer systems, the above-mentioned condition must prevail for at least one of the layers applied.

The refractive indices and the angles of the optically effective surfaces to one another must be selected so that all the other beams from the field of view under observation will be subjected as much as possible to the total reflection. The following equation may especially apply to the difference in refractive indices between the carrier of the totally reflecting layer and the totally reflecting layer itself:

n(glass)-n(layer)>0,3, so as to obtain a total reflection within a wide range of angles of incidence. This allows deflection of beams from a large range of angles by means of the deflection unit and permits images to be formed by the endoscope lens to obtain a large angle of the image field. The materials featuring these properties can be, for instance, MgF2 as material of the layer with n(layer)=1.38 and LaSF N31 as carrier with n(glass)=1.88.

As is well known, the totally reflecting coating may also be designed so that it simultaneously acts as a reflection-reducing layer. The advantage here is that interfering reflections are avoided to a great extent.

According to another preferred embodiment of the present invention, the deflection system is designed as a deflection unit comprising several prisms arranged sequentially according to the course of the beam. The said prisms are preferably arranged between the optical elements of the lens, especially between the front lens or the cover glass of the lens, and the remaining optical elements of the lens. Thus the deflection unit is a component of the endoscope lens. This allows a compact structure as well as cost-effective manufacture of the lens and the deflection unit.

Here it is particularly preferable for the prisms to be cemented together so as to obtain an especially compact and mechanically stable structure. Two or three prisms are sufficient in order to create a deflection unit provided with the desired properties.

According to another preferred embodiment of the present invention, the said thin layer is attached on a surface of one of the prisms, where another prism is cemented on. This surface will then be used in transmission as well as in reflection. The advantage here is an especially compact and mechanically stable structure as well as reasonable manufacturing cost, since no additional spacer or mounting elements will be used.

According to another preferred embodiment of the present invention, the prisms cemented together are each made of materials with identical refractive index. The advantage is that there is no refraction even for beams penetrating the common surface at an angle, and thus there are no imaging errors. Moreover, this structure will avoid undesired reflections.

According to another preferred embodiment of the present invention, the deflected beam entering the optical axis is reflected more than once in the last prism penetrated after one or more prisms in the deflection system have been penetrated. This makes it possible to obtain the desired deflection angle in a short length and without any loss of brightness or reduction of the image field diameter.

According to another preferred embodiment of the present invention, the entering beam is reflected not more than twice in each element. This makes it possible to use geometrically simple prisms with only three optically effective surfaces, where the beam is reflected once on not more than two surfaces, penetrates through one surface into the element, and exits through the other surface from the prism. Thus a surface can be used in transmission as well as in reflection.

According to another preferred embodiment of the present invention, the deflected beam entering the endoscope axis is vertically incident on each interface of the deflection system which is used in transmission, especially on the entering surface of the deflection unit. Since the deflection is thus exclusively obtained through reflection, the image errors normally caused by refracting elements will be avoided.

SUMMARY OF THE INVENTION

In accordance with the invention, either an odd or an even number of reflections can be obtained. Here a design of this invention's type of deflection system, where three or four reflections are obtained, is especially preferable.

In rigid endoscopes, the image relayed by the lens is usually passed on through relay lens systems to the eyepiece. In these systems, each of the images is first projected from one intermediate image plane into the next. Since this process involves an inversion, the said relay lens systems are also known as "inversion systems." Depending on the number of inversion systems determined by the length of the endoscope, additional inversion elements, such as an inverted prism, may be necessary in order to obtain a vertical non-reversed image.

In an endoscope comprising an odd number of inversion systems, it is therefore preferable to ensure a straight number of reflections in the deflection system, preferably four reflections. The advantage of this structure is that no further inversion elements will be needed, since a total even number of inversions will then occur in the endoscope including the image relayed by the lens.

For the same reason, in an endoscope comprising an even number of inversion systems, it is preferable if an odd number of reflections occur in the deflection system, preferably a total of three reflections. Since this produces an image that is non-reversed vertically but reversed laterally, additional inversion elements will still be necessary in order to obtain an image that is non-reversed both vertically and laterally, through a further reflection on a surface arranged accordingly.

The advantage of an endoscope comprising the invention's deflection system is that almost any deflection angles in the range of less than about 30 degrees, preferably in the range of 5 to 25 degrees and especially preferably if about 15 degrees, can be obtained thanks to such a structure. The use of reflective deflection elements does not have the disadvantages of refracting elements. The inventive deflection system, especially the inventive deflection unit, not only meets the spatial requirements for the use of endoscopes, but also reduces the cost of manufacture and assembly.

The following detailed description defines the present invention in further detail based on examples of the preferred embodiment.

DETAILED DESCRIPTION OF THE DRAWINGS

All examples of the inventive embodiment in FIGS. 1–6 show that the reflective deflection elements are arranged as a deflection unit between two optical elements of the lens, and therefore are part of the lens. These optical elements of the lens form the plano-concave front lens (1) and another lens (4) which is designed as a plano-convex structure here. No other optical elements of the lens successive to the lens (4) are shown. In the depicted examples, the deflection units are cemented together with both of these optical elements of the lens. The lens plane is arranged to the left of the front lens (1) whereas the image plane is located on the right of the other lens (4). The broken line on the figure shows the endoscope axis.

Each prism is provided with three optically effective surfaces. Those surfaces of prisms having no optical function may be ground evenly or cylindrically, for example, so as to save space. In all examples of the embodiment, the first surface of the first prism (2) is arranged vertically to the endoscope axis and represents the entering surface of the deflection unit. The third surface of the second prism (3) is arranged vertically to the axis of the endoscope and represents the exiting surface of the deflection unit. The other surfaces of the prisms may be arranged on a slant or parallel to the axis of the endoscope.

The refractive indices of the prisms are preferably identical, but they may also differ from one another. The illustrative examples show a refractive index of the prisms of n(glass)=1.88.

Figure 1:
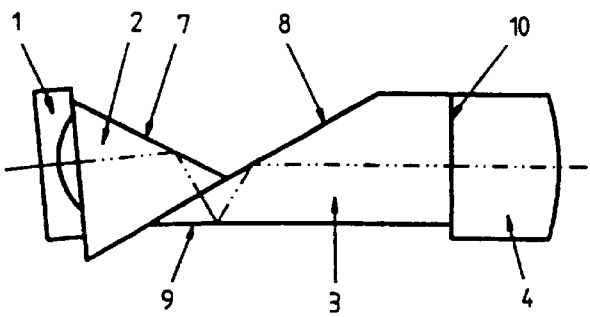
FIGS. 1–3: Three examples of the preferred embodiment comprising a deflection unit consisting of two simple prisms and allowing three reflections in the order of increasing deflection angle.
Figure 2:
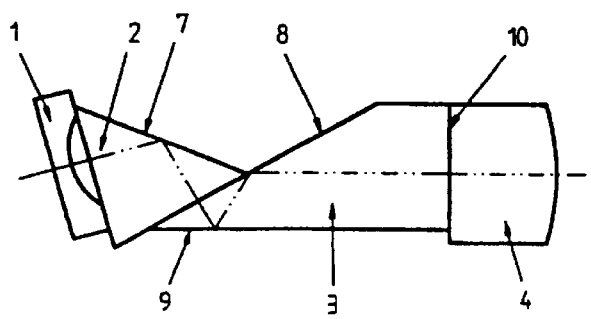
Figure 3:
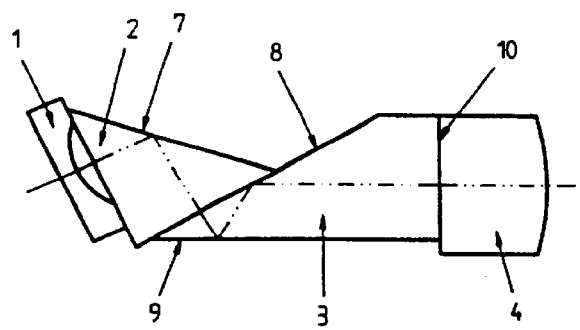

In the examples of embodiments shown in FIGS. 1–3, the deflection unit essentially comprises a first prism (2) and a second prism (3), where the first prism (2) is cemented to the slanting surface (8) of the second prism. After light has passed through the front lens (1), it enters the field of view from the lens and is reflected on the reflecting or totally reflecting surface (7) of the first prism, so that the endoscope axis is vertical to the common interface of the first prism (2) with the second prism (3). This surface is provided with a coating whose material, thickness, and composition are selected in order to allow a penetration of the beams to the lens as free of loss as possible. The totally reflected after they have been reflected on the reflecting or totally reflecting surface (9) of the second prism (3). After this third and final reflection, the course of the beam runs parallel to the axis of the endoscope and penetrates the remaining optical elements of the lens.

In the examples of embodiments shown in FIGS. 1–3, the "ridge angle" of the first prism of 65 degrees shown in FIG. 1 is shown enlarged to 90 degrees in FIG. 3 so as to achieve various angles of deflection, where the other two angles of the first prism are each identical. A ridge angle of 60 degrees results in a straight-view lens, that is, a deflection angle of 0 degrees, whereas a larger ridge angle, accordingly, allows a setting of a larger angle of deflection. The normal line to the slanting surface (8) of the second prism forms an angle of 60 degrees with the endoscope axis. Here the reflecting or totally reflecting surface (9) of the second prism is parallel to the endoscope axis.

Figure 4:
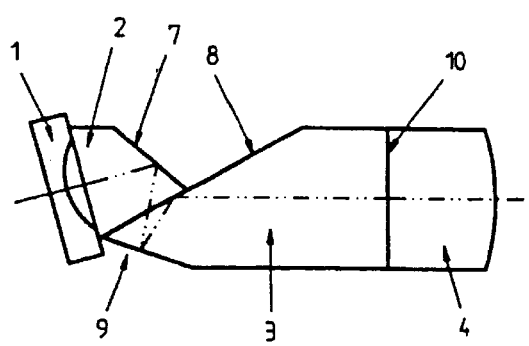
FIG. 4: A further example of the preferred embodiment comprising a deflection unit consisting of a deflection unit assembled by two prisms allowing three reflections.

In the example of embodiment shown in FIG. 4, the endoscope axis does not run vertically through the common interface between the first prism (2) and the second prism (3), but rather at an angle. As a result, the coating on the common interface is designed in a way that it is transparent at this angle, but totally reflecting during the ensuing reflection. The reflecting or totally reflecting surface (9) of the second prism here is inclined with respect to the axis of endoscope.

Figure 5:
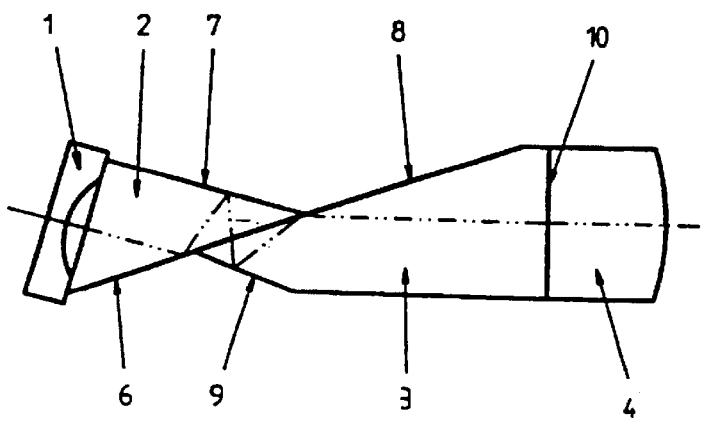
FIG. 5: An example of the preferred embodiment comprising a deflection unit consisting of a deflection unit assembled by two prisms allowing four reflections.

In the example of embodiment shown in FIG. 5, the entering beam is reflected not more than twice on the common interface between the first prism (2) and the second prism (3), and on the extensions (6) or (8) of this surface, and then penetrates once through this surface.

Figure 6:
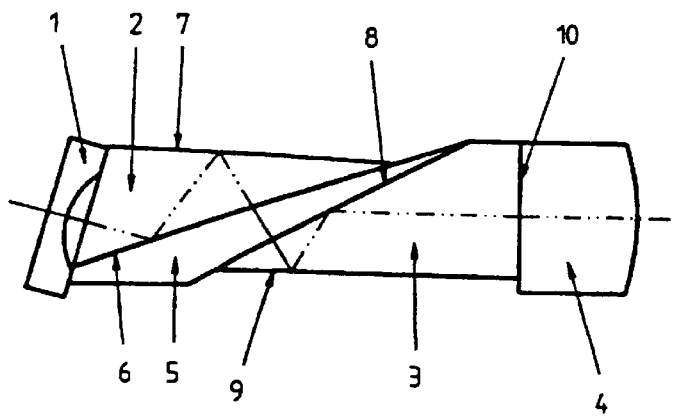
FIG. 6: An example of the preferred embodiment comprising a deflection unit consisting of three prisms allowing four reflections.

In the example of embodiment shown in FIG. 6, a wedge-shaped element (5) is provided which is cemented between the first prism (2) and the second prism (3) and which allows an additional setting of the deflection angle.

Figure 7:
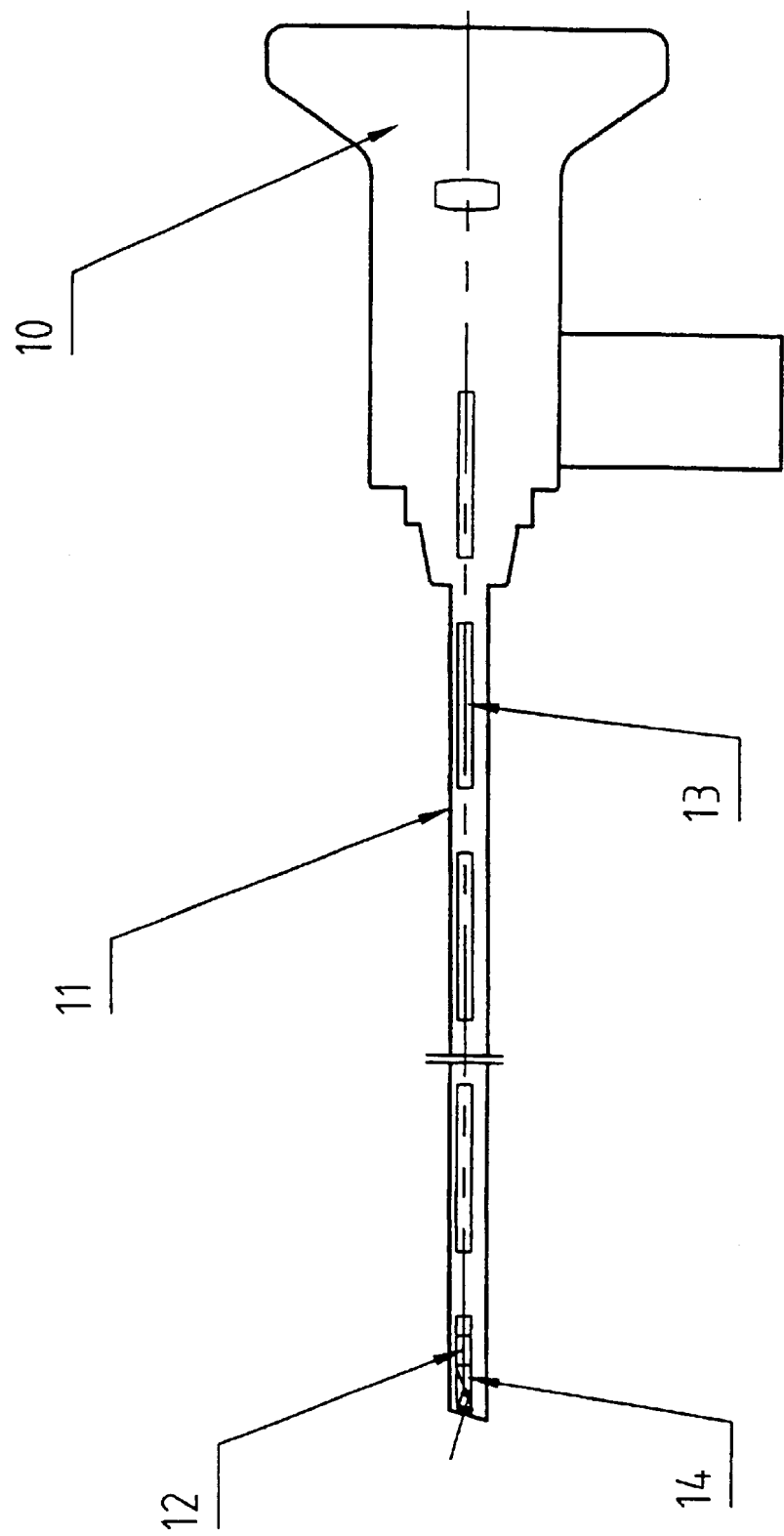
FIG. 7: An example of the preferred embodiment of an endoscope comprising the inventive deflection system.

In the example of embodiment shown in FIG. 7, an endoscope comprising the invention's deflection system consists of an eyepiece part (10) which—among other things—contains the eyepiece schematically shown in FIG. 7 as a lens, as well as a longitudinal shaft (11) for accommodating further optical elements that are arranged on the distal end of the endoscope. The lens (12) recording the scene under observation and projecting an intermediate image on a first intermediate image plane, as well as relay lens systems comprising each two rod-shaped lenses (13), are passing on the image from the lens (12) from an intermediate image plane by means of projection to the eyepiece. This example of embodiment shows that the lens (12) comprises the deflection unit (14), which allows an angle of view deflecting from the axis of the endoscope. The light-conducting connector for connecting an external source of light to illuminate the field of the object is shown schematically in FIG. 7 below the eyepiece part (10). Other features of the endoscope determined by its use, such as devices for combined use with instruments or suction or rinsing appliances, are not shown in FIG. 7.

In general, the present invention can be used on endoscopes or comparable viewing devices such as periscopes, regardless of the means of relaying the images, for instance, by means of relay lens systems, glass fibers, or electronic means, and irrespective of the specific use in medicine or technology, as well as for both rigid and flexible endoscopes or periscopes.

What is claimed is:

1. Endoscope with a relay system defining an endoscope axis, and a deflection system for deflecting a beam entering the endoscope at an angle greater than 0 degrees and less than or equal to 30 degrees with respect to said endoscope axis, while the deflection system contains reflective deflection elements provided with reflecting surfaces, and the reflecting surfaces are arranged so that the beams deflected into said endoscope axis are reflected more than twice;

at least one reflecting surface is used in transmission as well as in reflection; and wherein said endoscope axis is generally parallel to a longitudinal axis of said endoscope.

2. Endoscope in accordance with claim 1, characterized in that the said reflecting surface or surfaces will be used in the transmission only once.

3. Endoscope with a relay system defining an endoscope axis, and a deflection system for deflecting a beam entering the endoscope at an angle greater than 0 degrees and less than or equal to 30 degrees with respect to said endoscope axis, while the deflection system contains reflective deflection elements provided with reflecting surfaces, and the reflecting surfaces are arranged so that the beams deflected into said endoscope axis are reflected more than twice;

at least one reflecting surface is used in transmission as well as in reflection; and said reflecting surface or surfaces are provided with a thin layer onto which the beam is reflected.

4. Endoscope in accordance with claim 3, characterized in that the reflected beam entering the endoscope axis is totally reflected on the said reflecting surface or surfaces.

5. Endoscope in accordance with claim 4, characterized in that the reflective deflection elements form a deflection unit comprising several prisms arranged sequentially according to the course of the beam.

6. Endoscope in accordance with claim 5, characterized in that the prisms are cemented together.

7. Endoscope in accordance with claim 6, characterized in that the deflection unit consists of two or three prisms cemented together.

8. Endoscope in accordance with claim 6, characterized in that the thin layer is cemented onto the surface of a prism onto which another prism is cemented.

9. Endoscope in accordance with claim 8, characterized in that two prisms cemented together consist of materials with an identical refractive index.

10. Endoscope in accordance with claim 9, characterized in that the deflected beam entering the endoscope axis is reflected more than once in the prism which this beam last passed through.

11. Endoscope in accordance with claim 10, characterized in that the deflected beams entering the endoscope axis is reflected not more than twice in each prism.

12. Endoscope in accordance with claim 11, characterized in that the deflected beam entering the endoscope axis is vertically incident on the entering surface of the deflection unit.

13. Endoscope in accordance with claim 12, characterized in that the deflected beam entering the endoscope axis is vertically incident on each interface of the endoscope, which it is penetrating.

14. Endoscope in accordance with claim 13, characterized in that the deflected beam entering the endoscope axis is reflected not more than three times in the deflection system.

15. Endoscope in accordance with claim 14, characterized in that the deflected beam entering the endoscope axis is reflected not more than four times in the deflection system.

16. Endoscope in accordance with claim 15, characterized in that he reflective deflection elements are designed so that the deflected beam entering the endoscope axis is deflected at a visual angle of between 5 and 25 degrees.

* * * * *